COLD TERMINAL ELECTRICAL RESISTANCE HEATING CABLE

Original Filed Jan. 11, 1960

INVENTOR.
PETER J. FESSENDEN
BY Chapin & Neal
ATTORNEYS

COLD TERMINAL ELECTRICAL RESISTANCE HEATING CABLE

Original Filed Jan. 11, 1960

INVENTOR.
PETER J. FESSENDEN
BY Chapin & Neal
ATTORNEYS

United States Patent Office

Re. 26,522
Reissued Feb. 11, 1969

26,522
COLD TERMINAL ELECTRICAL RESISTANCE HEATING CABLE

Peter J. Fessenden, East Longmeadow, Mass., assignor to Springfield Wire, Inc., Springfield, Mass., a corporation of Massachusetts Original No. 3,045,102, dated July 17, 1962, Ser. No. 1,621, Jan. 11, 1960. Application for reissue Jan. 17, 1968, Ser. No. 718,270
U.S. Cl. 219—528 10 Claims
Int. Cl. H05b *3/34, 3/54*

Matter enclosed in heavy brackets [ ] appears in the original patent but forms no part of this reissue specification; matter printed in italics indicates the additions made by reissue.

*ABSTRACT OF THE DISCLOSURE*

*Electrical resistance heaters, such as defrosters, for providing heat within a chamber from a source of electricity outside the chamber. The heater includes a helical element wound on a core of insulation and having a heat emitting section and unheated or "cold terminal" sections integral with the heat emitting section, insulated therewith, and defined by a shorting strip extending longitudinally along the turns of resistance wire and extending from within the chamber to the outside. In one form the heater is a flexible cable having an extruded moisture impervious insulation. Another embodiment is a rigid tubular heater in which a flexible heater cable, insulated with heat resistant fibrous braid, is disposed within the tube wherein the cold terminals extend from within the tube into a molded moisture seal which has a relatively low rate of heat transfer and is formed over the ends of the tube.*

This invention relates to electrical heating apparatus and more particularly to flexible resistance heating wires for use in various types of heating equipment.

The principal object of this invention is to provide resistance heating wires having constructional characteristics which facilitate their manufacture and the assembly of heating hardnesses in which they are used.

Another object of this invention is to provide a resistance heating element in the form of a continuous length of flexible wire having constructional features which enable sections of the wire to be used as heating elements in various types of heating apparatus and with each section having predetermined portions which will remain unheated or "cold" when the wire is connected to a source of potential.

A further object of this invention is to provide a flexible resistance heating wire of the above type which may be adapted for use in heating apparatus by merely cutting the wire at predetermined points along its length.

A still further object of this invention is to provide a heating element of uniform cross-sectional size throughout its length having its end portions constructed to provide "cold" leads integral with the active heating portion of the element.

The above and other objects and advantages of this invention will be apparent from a reading of the following description and with reference to the accompanying drawing in which.

Figure 1:
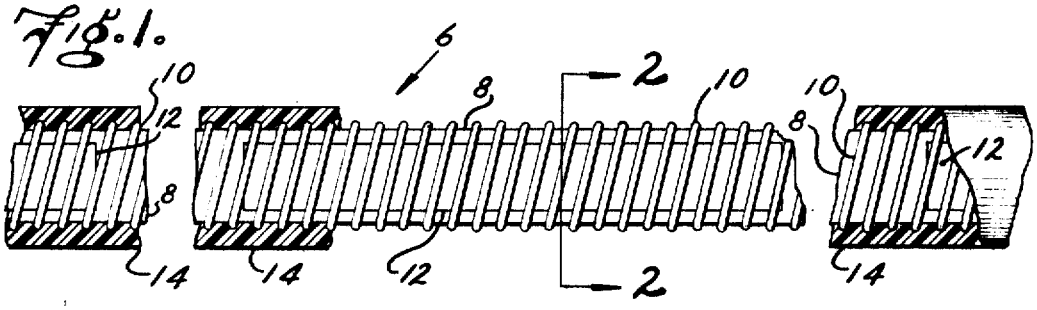
FIG. 1 is a plan view of a portion of heating wire, on a greatly enlarged scale, embodying this invention.
Figure 2:
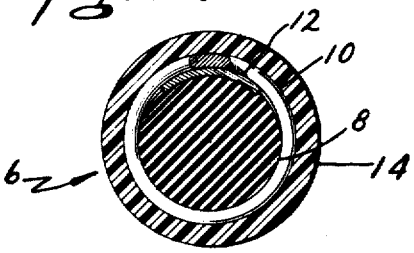
FIG. 2 is a section taken along line 2—2 of FIG. 1.

Referring in detail to the drawings, a portion of a heating element or wire embodying the invention is shown on a greatly enlarged scale generally at 6 in FIGS. 1 and 2. The heating wire comprises a flexible core 8 which is in the form of a continuous length of heat resistant insulating material such as fiberglass, asbestos, or the like. The core is preferably of small diameter which may be on the order of 1/32". A flexible resistance wire 10 is wound around the core 8 in a continuous spiral extending from one end of the core to the other. The resistance and heating capacity of the element 6 is related to the pitch of the spiral which is determined by the rate at which the core is fed through a serving spindle which winds the wire about the core. As the element comes from the serving spindle it may be wound on a suitable spool which may be marked with appropriate identifying data, such as the heating capacity of the wire.

In accordance with the illustrated embodiment of the invention, electrically conductive material is disposed longitudinally at predetermined spaced locations along the length of the core. The conductive material may comprise a plurality of flexible ribbons, strands or strips 12 of metallic material are disposed at longitudinally spaced locations along the core. The metal strips 12 underlie and electrically short circuit the overlying convolutions or coils formed by the resistance wire 10. The strips 12 are fitted between the core and resistance wire during the operation of coiling the wire around the core. The wire is wound with sufficient tightness to hold the strips in place on the core. The strips 12 may be formed of solid or laminated metallic foil preferably including a material of good electrical conductivity such as copper, or the like. The foil strips are preferably of a thickness which does not substantially reduce the flexibility of the short circuited portions of the heating wire nor substantially increase the diameter of the wire.

If a length of heating wire constructed as described above were connected to a source of electrical potential, the coils of the high resistance wire would become heated except those coils which are shorted by the foil strips 12. The shorted portions remain at a relatively low temperature or "cold." Thus the wire is constituted of alternate heat emitting and cold portions throughout its length in spite of the fact that the resistance wire 10 forms a continuous helix around the core 8.

Each strip 12 is of sufficient length so that when the heating wire is cut at points intermediate the length of its shorted portions, the shorted portions will be of proper size to provide cold lead wires or terminals for apparatus provided with sections which have been cut from the heating wire.

The choice of longitudinal spacing between adjacent strips 12 depends upon the length of heat emitting wire required for the heating harness or apparatus in which the wire is to be used. To facilitate use of the wire, the spool on which it is wound may be marked to indicate the length of active heating wire and the length of the shorted sections.

The heating element 6 may be provided with an insulating cover 14 circumferentially enclosing the core 8, the resistance wire 10, and the foil strips 12. The cover extends from end-to-end of the core and is of uniform cross-sectional size through its length. The cover may be formed of an insulating material which is capable of withstanding relatively high temperatures, such as a suitable polyvinyl resin compound, silicone rubber, fiberglass braid or the like. The type of insulation selected depends on the requirement of the apparatus in which the wire is to be used. One method of coating the core and resistance wire is to lead the wire through an extruder and coat it with a plastic insulating material. After the coating operation the wire may again be wound on a spool; the short circuited portions of the wire may be located by any convenient system or marked to facilitate cutting the wire into individual sections for assembly in various heating apparatus. Of course, it will be appreciated that the uninsulated heating wire could be embedded or molded in a suitable material or it may be inserted in a tube or sheath and surrounded with loose insulating or refractory material.

In the manufacture of electrical harnesses or other heating apparatus, a spool of wire is selected having the appropriate heating capacity and length of active heating sections. The wire is cut at points intermediate the length of its shorted portions forming a plurality of individual heating elements such as the one shown at 6' in FIG. 5. The heating element 6' has an active or heat producing portion 16 and cold lead portions 18 at each end.

Figure 5:
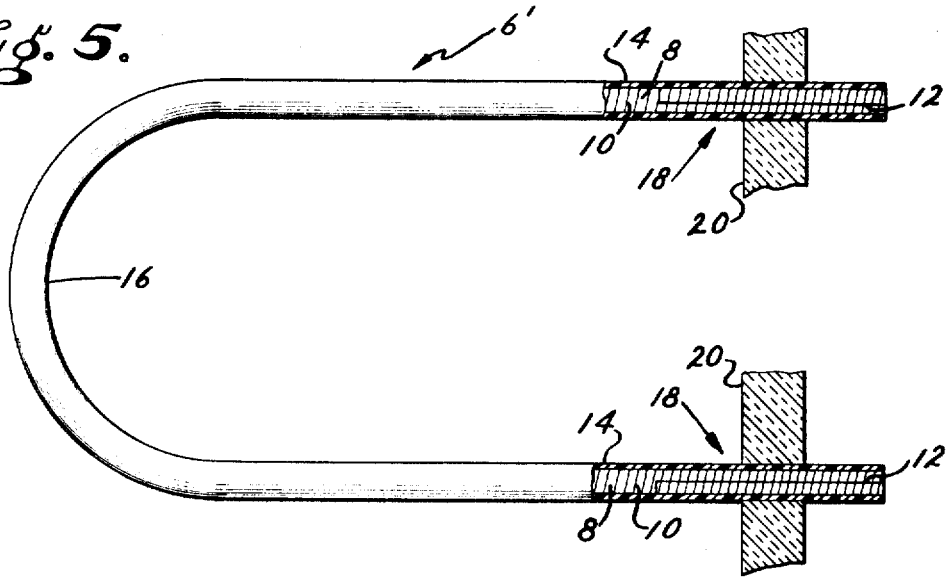
FIG. 5 is a view showing one application of the heating wire.

In FIG. 5 one application of the invention is illustrated. As shown, the heating element 6' is arranged in the form of a heating loop. The active portion 16 is disposed within a heating unit, such as a defroster or the like, and the cold lead portions 18 extend outwardly through a temperature insulating material 20. The fact that the terminal portions of the heating element, which extend through the insulating material, are "cold" overcomes any tendency of these portions becoming overheated. This tendency of the heating wire terminals to overheat, if not "cold," is caused by the low rate of heat transfer at the terminal portions compared with the rest of the unit which is disposed in the heat absorbing medium.

Figure 6:
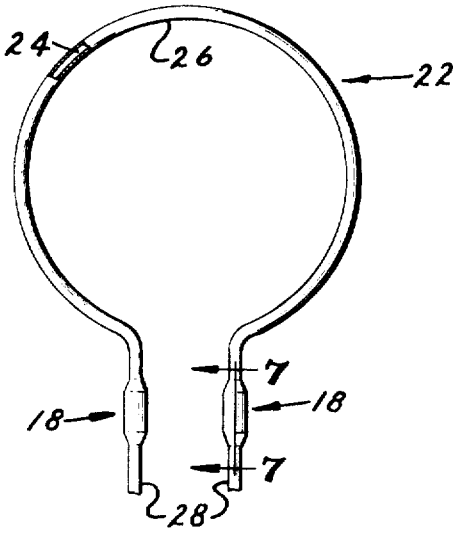
FIG. 6 is a view showing another application of the heating wire.
Figure 7:
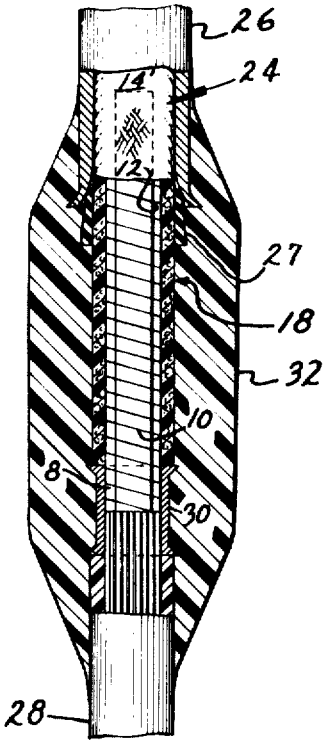
FIG. 7 is a section taken along line 7—7 of FIG. 6.

In FIG. 6 another heating unit embodying the invention is shown generally at 22. The unit 22 comprises a heating wire 24 disposed within a sheath or metal tube 26. The construction of the wire 24 is the same as the wire 6', described above, however its insulating cover 14' (FIG. 7) is shown as fiberglass braid preferable for high watt applications. The outer diameter of the heating wire 24, including its cover 14', is such as to permit the assembled wire to be threaded or inserted into the tube 26 with a relatively snug fit. The braided cover 14' electrically insulates the wire 10 from the metallic tube 26 and holds the wire 10 generally at the center or axis of the tube for uniform heat distribution and efficient heat transfer to the tube walls. The cold or shorted portions 18 of the heating wire are integral with the heat emitting portion within the tube and extend outwardly of the open ends of the tube 26 through annular plugs 27. Conductor wires 28 are connected to the outer or terminal ends of the heating wire by any suitable means, such as clamps 30. Portions of the insulation of both the heating wire 24 and conductor wires 28 are removed to enable the clamps 30 to be placed in direct contact with the lead wires and the coils of resistance wire 10. A seal 32 which may be formed of molded plastic material closes off and moisture-seals the open ends of the tube 26. The seal 32 also insulates and strengthens the connection of the lead wires 28 and heating wire 24. The generally uniform flexibility of the heating wire 24 and its uniform diameter facilitate its insertion in tubes of various shapes. Furthermore, the fact that the cold leads 18 extend beyond the ends of the tube simplify connection of the conductor wires to the heating element since it can be accomplished externally of the tube. As described above, the cold leads 18 overcome any tendency for the terminal portions of the unit becoming overheated as a result of the lower rates of heat transfer at these locations. The advantageous relationship of the integral cold leads relative to the ends of the tube 26 is achieved during the manufactures of the heating wire by selecting the proper longitudinal spacing and lengths of the foil strips 12.

Figure 4:
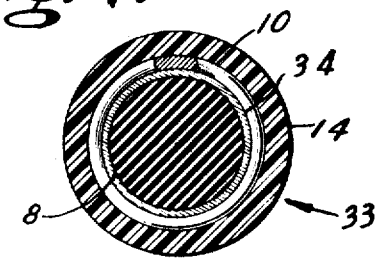
FIG. 4 is a section taken along line 4—4 of FIG. 3.
Figure 3:
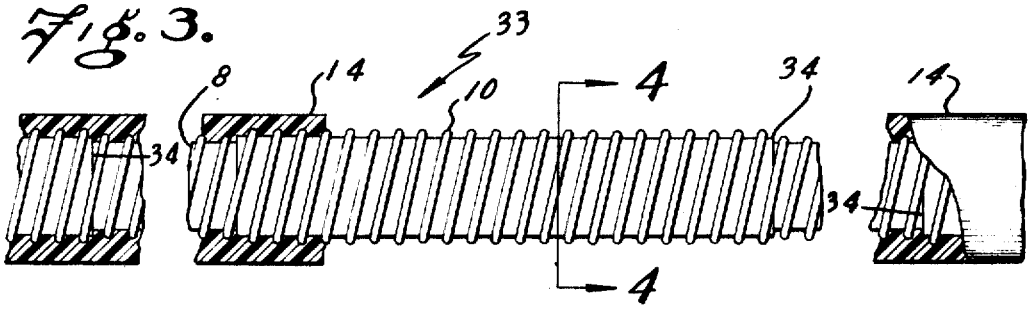
FIG. 3 is a plan view of an alternative form of heating wire embodying the invention.

An alternative form of the invention is shown generally at 33 in FIGS. 3 and 4. The heating wire is similar in operation and utility to the one described above, except that shorting strips 34 are provided which are of sufficient width to extend circumferentially around the core 8. The other elements of the heating wire 33 are identical to those of the wire 6 and are indicated by the same reference numerals.

Having thus described this invention, what is claimed is:

1. Electrical resistance heating cable for providing heat within a chamber from a source of electricity outside said chamber, said cable comprising a continuous flexible core of electrical insulating material, a resistance wire wound helically around said core and coterminous therewith, at least two length of electrical conductive material disposed longitudinally along said cable and electrically interconnecting the turns of said resistance wire at the terminal end portions thereof, said lengths of conductive material being of sufficient extent to provide unheated terminal sections for said cable to extend from within to without said chamber and a continuous covering of electrical insulation disposed around said cable throughout its length, including said terminal sections.

2. Electrical resistance heating cable for providing heat within a chamber from a source of electricity outside said chamber, said cable comprising a flexible core of electrical insulating material, a resistance wire wound helically around said core and coterminous therewith, a plurality of lengths of electrically conductive material disposed longitudinally along said cable and electrically interconnecting the turns of said resistance wire at the terminal ends thereof, said lengths of conductive material being of sufficient extent to provide substantially unheated terminal sections for said cable to extend from within to without said chamber, and electrical insulation covering said cable throughout its length, said core, coil and insulation having uninterrupted continuity throughout the length of said cable.

3. Electrical heating cable as set forth in claim 2 above in which said insulation is moisture impervious.

4. Electrical heating cable for use in the manufacture of electrical heaters, said cable comprising a plurality of alternate heat producing and substantially unheated sections, said cable comprising a flexible core of electrical insulating material, a resistance wire wound helically around said core and coterminous therewith, said unheated sections including predetermined lengths of conductive material longitudinally interconnecting turns of said resistance wire, and a moisture impervious electrical insulating material covering said core, coil and conductive material throughout the length of said cable, each of said predetermined lengths of conductive material being of sufficient extent to provide two unheated terminal connections when an unheated section is severed intermediate its ends, each of said unheated terminal connections being of sufficient extent to extend from within to without a zone to be heated whereby are provided a plurality of electrical heating cables each having at least two unheated terminal sections, said terminal sections and heat producing sections having uninterrupted continuity throughout the length of said cable.

5. Electrical cable as set forth in claim 4 in which said cable is provided with markings to enable the unheated and heat porducing sections to be distinguished.

6. An electrical heating unit comprising a core in the form of a length of flexible insulating material, a resistance wire wound helically around said core continuously over its entire length, lengths of flexible metallic material underlying and electrically short circuiting some of the coils of said resistance wire, said metallic material being disposed adjacent the opposite ends of said core and being of sufficient length to provide unheated leads, a cover of flexible electrical insulation circumferentially enclosing said resistance wire, core and lengths of metallic material throughout the length of said core and providing a heating cable of generally uniform cross sectional size throughout its length, an open-ended tubular member, said cable being disposed in said tubular member with said unheated leads extending from within the tube outwardly of the ends of the tube, conductor wires electrically connected to the coils of said resistance wire at the terminal ends thereof, and insulating material sealing the ends of said tube and insulating the connecting portions of the conductor and resistance wires.

*7. Electrical resistance heating cable as set forth in claim 1 in which said continuous covering of electrical insulation is flexible and surrounds said flexible core, lengths of conductive material and resistance wire, and in which said chamber comprises a metal tube in which covered heating cable is disposed.*

*8. Electrical resistance heating cable as set forth in claim 1 in which said continuous covering of electrical insulation, resistance wire and lengths of conductive material are flexible, said insulation surrounding said flexible core, lengths of conductive material and resistance wire to form said cable, said cable being flexible and of generally uniform diameter throughout its length, including said unheated terminal sections thereof.*

*9. Electrical resistance heating cable as set forth in claim 1 in which a material having a low rate of heat transfer surrounds the insulated cable at said unheated terminal section.*

*10. Electrical resistance heating cable as set forth in claim 7 in which said electrical insulation is fiberglass braided around said flexible core, lengths of conductive material and resistance wire to form said cable, said cable being generally flexible and of generally uniform diameter throughout its length, including the unheated sections thereof, a molded insulating seal surrounding the end of said tube and in sealing engagement therewith, said unheated terminal section extending from within to without the portion of said tube bearing said seal.*

References Cited

The following references cited by the Examiner, are of record in the patented file of this patent or the original patent.

UNITED STATES PATENTS

| | | | |
|---|---|---|---|
| 1,435,392 | 11/1922 | Heiser | 219—542 |
| 2,637,180 | 5/1953 | Atchison | 62—276 |
| 2,905,918 | 9/1959 | Wagner | 338—210 |
| 1,192,153 | 7/1916 | Ayer | 219—528 |
| 1,614,168 | 1/1927 | Abbott | 219—540 |
| 1,624,345 | 4/1927 | Keene | 174—84 |
| 1,903,142 | 3/1933 | Schellenger | 338—139 |
| 1,948,354 | 2/1934 | Lodge | 338—139 |
| 2,053,933 | 9/1936 | Abbott | 338—243 |
| 2,639,359 | 5/1953 | Glenn | 338—214 |
| 2,712,048 | 6/1955 | Huetten et al. | 338—308 |
| 2,724,759 | 11/1955 | Daniels | 338—16 |
| 2,727,120 | 12/1955 | Boggs | 174—75 |
| 2,879,364 | 3/1959 | Mucher | 337—208 |

FOREIGN PATENTS

| | | |
|---|---|---|
| 410,594 | 5/1934 | Great Britain. |
| 576,079 | 5/1959 | Canada. |

VOLODYMYR Y. MAYEWSKY, *Primary Examiner.*

U.S. Cl. X.R.

219—541, 542, 549, 553; 338—139; 174—75, 84, 181